(12) United States Patent
Liao

(10) Patent No.: US 11,635,446 B2
(45) Date of Patent: Apr. 25, 2023

(54) HOLDER SYSTEM

(71) Applicant: Winbond Electronics Corp., Taichung (TW)

(72) Inventor: Hsueh-Cheng Liao, Yunlin County (TW)

(73) Assignee: WINBOND ELECTRONICS CORP., Taichung (TW)

(*) Notice: Subject to any disclaimer, the term of this patent is extended or adjusted under 35 U.S.C. 154(b) by 0 days.

(21) Appl. No.: 17/706,851

(22) Filed: Mar. 29, 2022

(65) Prior Publication Data

US 2022/0413006 A1    Dec. 29, 2022

(30) Foreign Application Priority Data

Jun. 28, 2021   (TW) .................. 110123566

(51) Int. Cl.
*G01Q 30/20*   (2010.01)

(52) U.S. Cl.
CPC .................... *G01Q 30/20* (2013.01)

(58) Field of Classification Search
CPC .................................................. G01Q 30/20
USPC ............... 250/440.11, 441.11, 442.11, 443.1
See application file for complete search history.

(56) References Cited

U.S. PATENT DOCUMENTS

| 2003/0119200 A1* | 6/2003 | Taft ........................ G01N 1/36 435/40.5 |
| 2007/0184755 A1* | 8/2007 | Park ...................... B24B 37/30 451/41 |
| 2010/0184127 A1* | 7/2010 | Williamson, IV ........ B01L 9/52 435/40.52 |

FOREIGN PATENT DOCUMENTS

CN    108181487 A    6/2018

* cited by examiner

*Primary Examiner* — Nicole M Ippolito
(74) *Attorney, Agent, or Firm* — Muncy, Geissler, Olds & Lowe, P.C.

(57) ABSTRACT

A holder system for a scanning probe microscope, including a holder and a fixer. The holder includes a holder top surface, and a holder sidewall. The holder top surface is configured to hold a sample. The holder sidewall extends from the holder top surface. The fixer includes a fixer fixing portion, and a fixer connecting portion. The fixer fixing portion is configured to affix the sample to the holder top surface. The fixer connecting portion is connected to the fixer fixing portion, and is affixed to the holder sidewall. An area to-be-tested of the sample is exposed to the fixer fixing portion.

13 Claims, 3 Drawing Sheets

HOLDER SYSTEM

CROSS REFERENCE TO RELATED APPLICATIONS

This application claims priority of Taiwan Patent Application No. 110123566, filed on Jun. 28, 2021, the entirety of which is incorporated by reference herein.

BACKGROUND OF THE INVENTION

Field of the Invention

The present disclosure relates to a holder system, and, in particular, to a holder system for a scanning probe microscope (e.g., an atomic force microscope).

Description of the Related Art

When using a scanning probe microscope (for example, an atomic force microscope), it is necessary to operate it in a conductive, highly-vacuumed, and stable environment. Moreover, the sample to be tested needs to be affixed to a holder so that the Nano probe can scan the sample. The current fixing method uses adhesive tape (for example, a conductive aluminum tape) to attach the sample to the holder.

However, the organic compounds of conductive aluminum tape will volatilize in a low-pressure environment and form carbon deposits on the test piece. Therefore, the conductivity of the test piece is negatively affected. Furthermore, since the conductive aluminum tape will generate stress in a high-temperature environment, when the stress is released, the test piece will drift or vibrate.

The current solution is to manually clean the carbon deposits on the test piece, and release the stress by waiting for a long time. This method is time-consuming and uneconomical. Therefore, a holder system is needed to affix the test piece to the holder without material volatilization and thermal drift.

BRIEF SUMMARY OF THE INVENTION

An embodiment of the present disclosure provides a holder system for a scanning probe microscope, including a holder, and a fixer. The holder includes a holder top surface, and a holder sidewall. The holder top surface is configured to hold a sample. The holder sidewall extends from the holder top surface. The fixer includes a fixer fixing portion, and a fixer connecting portion. The fixer fixing portion is configured to affix the sample to the holder top surface. The fixer connecting portion is connected to the fixer fixing portion, and is affixed to the holder sidewall. An area to-be-tested of the sample is exposed to the fixer fixing portion.

In one embodiment, the holder further includes a holder screw hole, and the fixer further includes a fixer periphery and a fixing screw. The fixer periphery surrounds and is connected to the fixer fixing portion. The fixer periphery includes a fixer screw hole. The fixing screw is inserted into the holder screw hole and the fixer screw hole to affix the fixer to the holder. In one embodiment, the fixer fixing portion applies stress to the sample toward the holder top surface.

In one embodiment, the holder sidewall includes a holder sidewall fixing portion, and the fixer connecting portion is affixed to the holder sidewall by the holder sidewall fixing portion. In one embodiment, the fixer connecting portion has a spiral structure, and the holder sidewall fixing portion has a threaded structure. In one embodiment, the fixer connecting portion and the holder sidewall fixing portion each has a hooked structure.

In one embodiment, the area to-be-tested of the sample protrudes from the fixer fixing portion. In one embodiment, the fixer fixing portion has a reticulated structure.

In addition, an embodiment of the present disclosure provides a holder system for a scanning probe microscope, including a holder and a fixer. The holder includes a holder top surface and a holder sidewall. The holder top surface has a platform structure, and is configured to hold a sample. The holder sidewall is connected to the holder top surface. The fixer includes a fixer fixing portion and a fixer connecting portion. The fixer fixing portion is configured to press the sample on the holder top surface. The fixer connecting portion is connected to the fixer fixing portion. The fixer connecting portion is affixed to the holder sidewall. There is a gap between the fixer and the holder top surface.

In one embodiment, a first height of an area to-be-tested of the sample relative to the holder top surface is greater than a second height of an edge portion of the sample relative to the holder top surface. In one embodiment, the fixer fixing portion has a reticulated structure. In one embodiment, the fixer fixing portion is in direct contact with an edge portion of the sample. In one embodiment, the fixer fixing portion is not in contact with an area to-be-tested of the sample.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
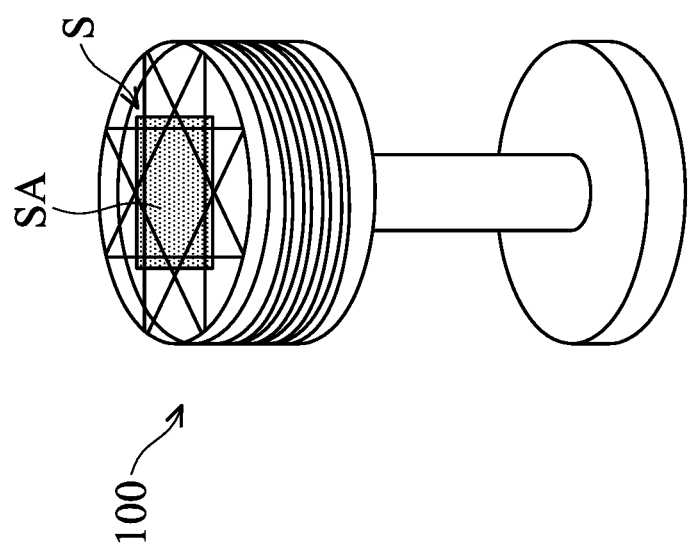
FIG. 1 shows a perspective view of a holder system and a sample, in accordance with some embodiments.

Please refer to FIG. 1, a holder system 100 of the present disclosure is used to hold a sample S, so that a scanning probe microscope (e.g., an atomic force microscope) can inspect the sample S. The scanning probe microscope may use a Nano probe to scan the area to-be-tested SA of the sample S, and thereby obtain information about the area to-be-tested SA.

Figure 2:
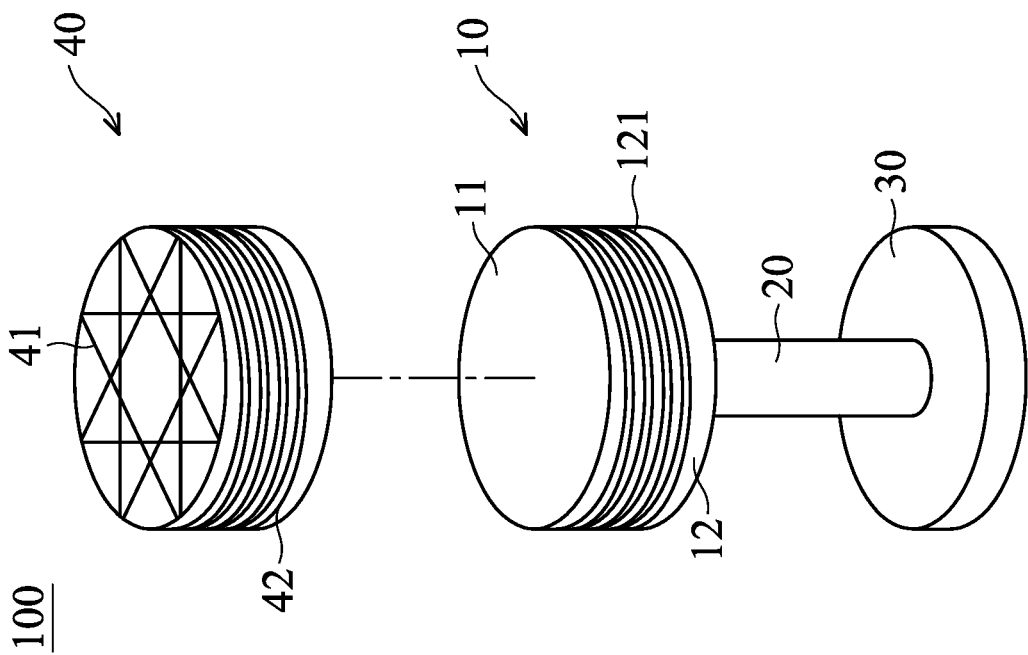
FIG. 2 shows an exploded view of the holder system, in accordance with some embodiments.

Please refer to FIG. 2, the holder system 100 may include a holder 10, a supporting column 20, a base 30, and a fixer 40. The holder 10 is connected to the base 30 via the supporting column 20, and the fixer 40 may be attached to and/or detached from the holder 10. The base 30 may be connected to the external components or other components of the scanning probe microscope.

It should be noted that the holder 10 and the fixer 40 may be made by the same material, such as stainless steel, aluminum, and alloys thereof. Preferably, the holder system 100 (including the holder 10, the supporting column 20, the base 30, and the fixer 40) as a whole has the same material, such as stainless steel, aluminum, and alloys thereof. Therefore, since the holder 10 and the fixer 40 have the same thermal expansion coefficient, there is no unbalanced stress between the holder 10 and the fixer 40 when the holder system 100 experiences a high temperature.

The holder 10 may include a holder top surface 11 and a holder sidewall 12. The holder top surface 11 may have a platform structure 11a for holding the sample S. The holder sidewall 12 is connected to the holder top surface 11, and the holder sidewall 12 extends toward the base 30 from the holder top surface 11 (that is, along the extending direction of the supporting column 20).

The fixer 40 may include a fixer fixing portion 41 and a fixer connecting portion 42. The fixer fixing portion 41 can fix the sample S placed on the top surface 11 of the holder. The fixer connecting portion 42 is connected to the fixer fixing portion 41, and the fixer connecting portion 42 is affixed to the holder sidewall 12. Specifically, the holder sidewall 12 may include a holder sidewall fixing portion 121. The fixer connecting portion 42 is affixed to the holder sidewall 12 by the holder sidewall fixing portion 121.

Figure 3:
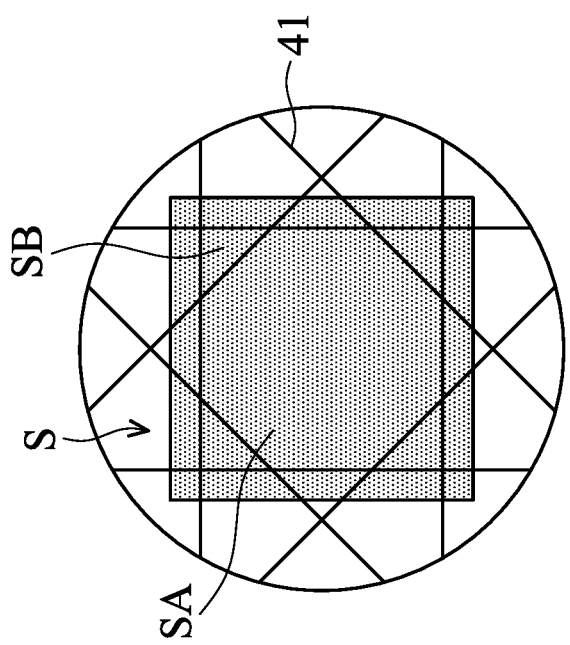
FIG. 3 shows a top view of the holder system, in accordance with some embodiments.

Please refer to FIG. 3, the fixer fixing portion 41 may press an edge portion SB of the sample S to affix the sample S on the holder top surface 11. The fixer fixing portion 41 may have a reticulated structure so that the fixer fixing portion 41 may uniformly apply stress to the edge portion SB of the sample S.

It should be noted that the fixer fixing portion 41 is in direct contact with the edge portion SB of the sample S, and the fixer fixing portion 41 applies stress on the edge portion SB toward the holder top surface 11; however, the fixer fixing portion 41 is not in contact with or does not press the area to-be-tested SA of the sample S. In other words, the area to-be-tested SA is exposed to the fixer fixing portion 41.

Figure 4:
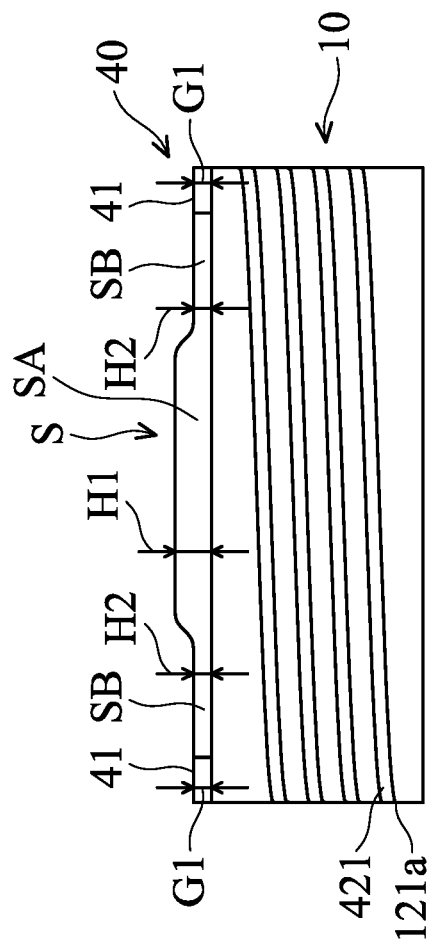
FIG. 4 shows a side view of a holder, a fixer, and the sample, in accordance with some embodiments.

As shown in FIG. 4, since the edge portion SB is pressed by the fixer fixing portion 41, a first height H1 of the area to-be-tested SA relative to the holder top surface 11 is greater than a second height H2 of the edge portion SB relative to the holder top surface 11. The second height H2. There is a first gap G1 between the fixer fixing portion 41 and the top surface 11 of the holder. In other words, the fixer fixing portion 41 is not in direct contact with the holder top surface 11. The width of the first gap G1 may be the same as the second height H2. Moreover, the area to-be-tested SA further protrudes from the fixer fixing portion 41.

In the present embodiment, the fixer connecting portion 42 has a spiral structure 421, and the holder sidewall fixing portion 121 has a corresponding threaded structure 121a. The spiral structure 421 of the fixer connecting portion 42 may be screwed (clockwise or counter-clockwise) into the threaded structure 121a of the holder sidewall fixing portion 121, so that the fixer 40 is coupled to the holder 10.

Figure 5:
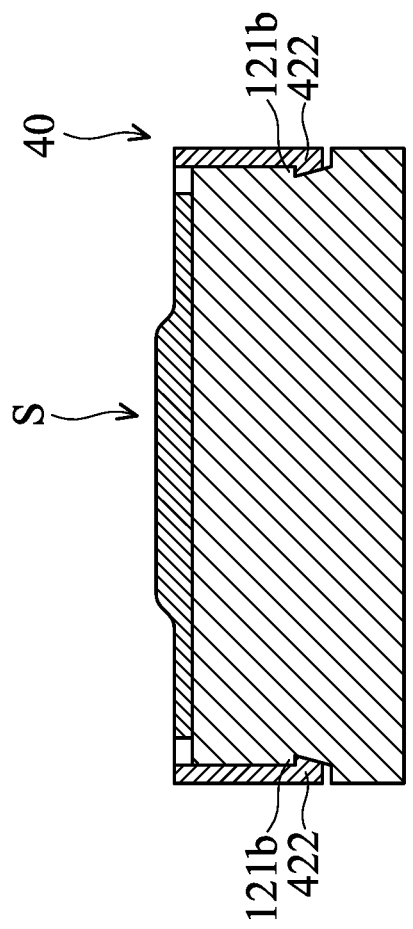
FIG. 5 shows a cross-sectional view of the holder, the fixer, and the sample, in accordance with some embodiments.

As shown in FIG. 5, in one embodiment, the holder sidewall fixing portion 121 has a plurality of hooked structures 121b, and the fixer connecting portion 42 has a corresponding plurality of hooked structures 422. The fixer 40 can be coupled to the holder 10 by hooking the hooked structure 121b of the holder sidewall fixing portion 121 to the hooked structure 422 of the fixer connecting portion 42.

Figure 6:
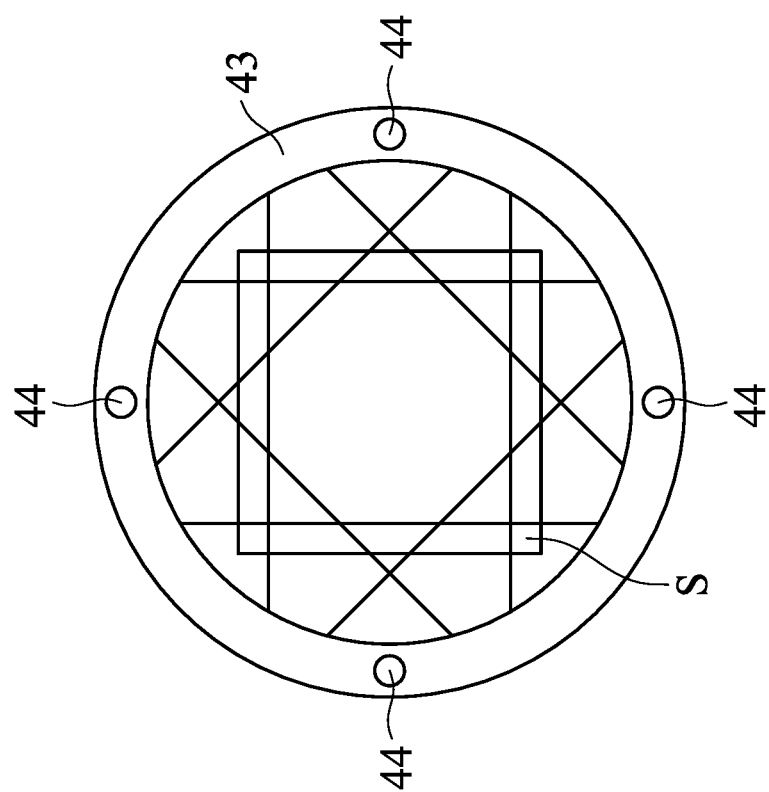
FIG. 6 shows a top view of the holder system, in accordance with some embodiments.
Figure 7:
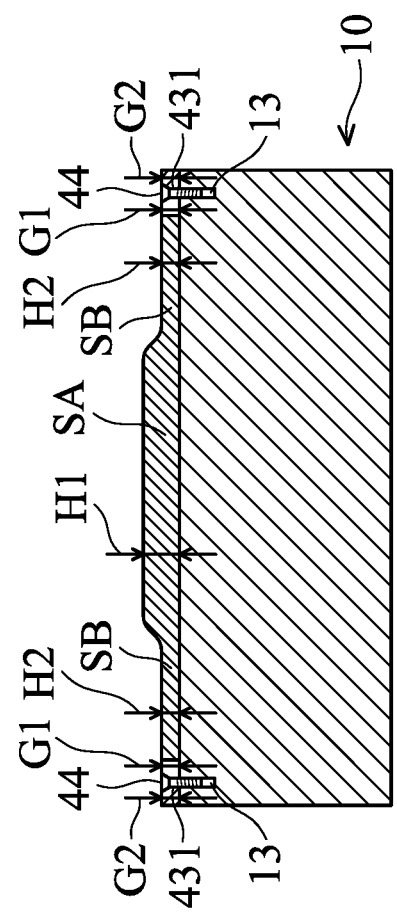
FIG. 7 shows a cross-sectional view of the holder, the fixer, and the sample, in accordance with some embodiments.

As shown in FIG. 6 and FIG. 7, in one embodiment, the holder 10 may further include a plurality of holder screw holes 13, and the fixer 40 may also include a fixer periphery 43 and a plurality of fixing screws 44.

The holder screw holes 13 can be evenly distributed around the periphery of the holder 10. The fixer periphery 43 surrounds and connects to the fixer fixing portion 41. Specifically, the holder periphery 43 is located at the periphery of the fixer fixing portion 41. There is a second gap G2 between the fixer periphery 43 and the holder 10. The width of the second gap G2 may be the same as the width of the first gap G1 or the second height H2.

The fixer periphery 43 may include a plurality of fixer screw holes 431. The fixer screw holes 431 may be evenly distributed on the fixer periphery 43 and is correspond to the holder screw holes 13. Moreover, the fixer screw hole 431 penetrates through the fixer periphery 43. The fixing screw 44 may be inserted into the fixer screw hole 431 and the holder screw hole 13. Specifically, the fixing screw 44 may penetrate the fixing screw hole 431 to couple the fixing 40 to the holder 10.

The fixing screw hole 431 and the holder screw hole 13 may each have a threaded structure where the fixing screw 44 may be screwed in or screwed out. In addition, the second height H2, the first gap G1 and the second gap G2 may be adjusted by screwing in or screwing out the fixing screw 44.

In one embodiment, the holder system 100 may use any combination of the spiral structure 421 and the threaded structure 121a, the hooked structure 422 and the hooked structure 121b, and the fixing screw 44 and the fixing screw hole 431, and the holder screw hole 13, so that the fixer 40 can be more firmly fixed to the holder 10.

In general, the holder system 100 of the present disclosure may fix the sample S to the holder 10 without using glue (for example, without using an adhesive tape or a conductive aluminum tape, etc.). Therefore, the scanning probe microscope with the holder system 100 of the present disclosure will not have the problem of organic compound volatilization. Therefore, the holder system 100 of the present disclosure can solve the disadvantage of carbon deposits on the sample S, and make the results of the scanning probe microscope more accurate.

Furthermore, the holder system 100 of the present disclosure can also avoid unbalance stress caused by different thermal expansion coefficients. Therefore, the holder system 100 of the present disclosure can solve the problem of thermal drift caused in a high-temperature environment, and make the results of the scanning probe microscope more stable.

Moreover, since there is no need to manually clean the carbon deposits and no need to wait for the stress balance of the tape (for example, a conductive aluminum tape), the holder system 100 of the present disclosure can avoid human error and save operation time, so that using the scanning probe microscope for detecting the sample S is faster and more reliable.

In addition, the holder system 100 of the present disclosure can also quickly and firmly fix the fixer 40 to the holder 10, so as to affix the sample S to the holder 10 by using any combination of the spiral structure 421 and the threaded structure 121a, the hooked structure 422 and the hooked structure 121b, and the fixing screw 44 and the fixer screw hole 431 and the holder screw hole 13. Therefore, the holder system 100 of the present disclosure also has the advantages of quick installation and removal.

It should be noted that although the present disclosure gives an atomic force microscope as a main example of the scanning probe microscope. However, in fact, the holder system 100 of the present disclosure may be applied to scanning probe microscopes other than atomic force microscopes. Specifically, the holder system 100 of the present disclosure may be applied to any microscope that uses Nano probes to achieve the advantages and effects described herein.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A holder system for a scanning probe microscope, comprising:
    a holder, comprising:
        a holder top surface, configured to hold a sample; and
        a holder sidewall, extending from the holder top surface; and
    a fixer, comprising:
        a fixer fixing portion, configured to affix the sample to the holder top surface; and
        a fixer connecting portion, connected to the fixer fixing portion, and being fixed to the holder sidewall,
    wherein an area to-be-tested of the sample is exposed to the fixer fixing portion.

2. The holder system as claimed in claim 1, wherein the holder further comprises a holder screw hole, and the fixer further comprises:
    a fixer periphery, surrounding and connected to the fixer fixing portion, wherein the fixer periphery comprises a fixer screw hole; and
    a fixing screw, inserted into the holder screw hole and the fixer screw hole to affix the fixer to the holder.

3. The holder system as claimed in claim 1, wherein the fixer fixing portion applies stress to the sample toward the holder top surface.

4. The holder system as claimed in claim 1, wherein the holder sidewall comprises a holder sidewall fixing portion, and the fixer connecting portion is affixed to the holder sidewall by the holder sidewall fixing portion.

5. The holder system as claimed in claim 4, wherein the fixer connecting portion has a spiral structure, and the holder sidewall fixing portion has a threaded structure.

6. The holder system as claimed in claim 4, wherein the fixer connecting portion and the holder sidewall fixing portion each has a hooked structure.

7. The holder system as claimed in claim 1, wherein the area to-be-tested of the sample protrudes from the fixer fixing portion.

8. The holder system as claimed in claim 1, wherein the fixer fixing portion has a reticulated structure.

9. A holder system for a scanning probe microscope, comprising:
    a holder, comprising:
        a holder top surface, having a platform structure, and configured to hold a sample; and
        a holder sidewall, connected to the holder top surface; and
    a fixer, comprising:
        a fixer fixing portion, configured to press the sample on the holder top surface; and
        a fixer connecting portion, connected to the fixer fixing portion,
    wherein the fixer connecting portion is affixed to the holder sidewall,
    wherein there is a gap between the fixer and the holder top surface.

10. The holder system as claimed in claim 9, wherein a first height of an area to-be-tested of the sample relative to the holder top surface is greater than a second height of an edge portion of the sample relative to the holder top surface.

11. The holder system as claimed in claim 9, wherein the fixer fixing portion has a reticulated structure.

12. The holder system as claimed in claim 9, wherein the fixer fixing portion is in direct contact with an edge portion of the sample.

13. The holder system as claimed in claim 9, wherein the fixer fixing portion is not in contact with an area to-be-tested of the sample.

* * * * *